(12) United States Patent
Daton-Lovett

(10) Patent No.: US 10,288,455 B2
(45) Date of Patent: May 14, 2019

(54) METHODS OF DEPLOYING FIBRE OPTICS VIA A COILABLE MEMBER FOR SENSING OR COMMUNICATIONS APPLICATIONS

(71) Applicant: RTL Materials Ltd., Lymington, Hampshire (GB)

(72) Inventor: Andrew James Daton-Lovett, Lymington (GB)

(73) Assignee: RTL Materials Ltd., Lymington Hampshire (GB)

( * ) Notice: Subject to any disclaimer, the term of this patent is extended or adjusted under 35 U.S.C. 154(b) by 97 days.

(21) Appl. No.: 15/124,720

(22) PCT Filed: Mar. 11, 2015

(86) PCT No.: PCT/GB2015/050716
§ 371 (c)(1),
(2) Date: Sep. 9, 2016

(87) PCT Pub. No.: WO2015/136286
PCT Pub. Date: Sep. 17, 2015

(65) Prior Publication Data
US 2017/0016746 A1    Jan. 19, 2017

(30) Foreign Application Priority Data

Mar. 12, 2014  (GB) .................................. 1404328.5

(51) Int. Cl.
| | | |
|---|---|---|
| *G01L 1/00* | (2006.01) | |
| *G01D 5/353* | (2006.01) | |
| *G01D 11/30* | (2006.01) | |

(52) U.S. Cl.
CPC ............. *G01D 5/353* (2013.01); *G01D 11/30* (2013.01)

(58) Field of Classification Search
CPC .......... H01Q 1/36; G01D 11/30; G01D 5/353; E21B 47/01; G01H 17/00; G01L 1/00
(Continued)

(56) References Cited

U.S. PATENT DOCUMENTS 5,014,015 A   5/1991  Hawkins
5,193,912 A   3/1993  Seberger
(Continued)

FOREIGN PATENT DOCUMENTS

GB   2491822 A   12/2012
GB   2510340 A    8/2014
(Continued)

OTHER PUBLICATIONS

International Search Report dated Oct. 13, 2015 in corresponding International Patent Application No. PCT/GB2015/050716.
(Continued)

*Primary Examiner* — Que Tan Le
(74) *Attorney, Agent, or Firm* — Pepper Hamilton LLP

(57) ABSTRACT

The present application describes methods and apparatus relating to sensor assemblies and fiber optic assemblies. In one example, a method is described of deploying a sensor assembly (1) for sensing a property associated with a structure of interest (100). The sensor assembly (1) includes an elongate member (2) configurable between a coiled form and an extended form and at least one sensor (3) disposed along at least a part of the longitudinal extent of the member. The method comprises uncoiling the elongate member (2) and positioning the sensor assembly (1), and then forming the structure of interest around the sensor assembly (1) or introducing a filler material in the space between the sensor assembly (1) and the structure of interest such that the sensor assembly (1) is coupled to the structure and the property of the structure can be sensed by the sensor (3).

24 Claims, 6 Drawing Sheets

(58) Field of Classification Search
 USPC .................................................. 250/227.14
 See application file for complete search history.

(56) References Cited

U.S. PATENT DOCUMENTS

| | | | |
|---|---|---|---|
| 5,440,193 | A | 8/1995 | Barrett |
| 6,679,334 | B2 | 1/2004 | Johnson et al. |
| 8,162,539 | B2 | 4/2012 | Mau et al. |
| 8,191,792 | B2 | 6/2012 | Bandoh |
| 9,541,447 | B2 * | 1/2017 | Daton-Lovett ..... E21B 47/0001 |
| 2004/0168521 | A1 | 9/2004 | Andersen |
| 2005/0210961 | A1 | 9/2005 | De Aquino |
| 2008/0043803 | A1 | 2/2008 | Bandoh |
| 2009/0316751 | A1 | 12/2009 | Mau et al. |
| 2010/0089478 | A1 | 4/2010 | Gudme |
| 2012/0210793 | A1 | 8/2012 | Daton-Lovett |

FOREIGN PATENT DOCUMENTS

| | | |
|---|---|---|
| WO | 88/08620 | 11/1988 |
| WO | 97/35706 | 10/1997 |
| WO | 99/62811 | 12/1999 |
| WO | 99/62812 | 12/1999 |
| WO | 02/25057 A1 | 3/2002 |
| WO | 2008/021881 A2 | 2/2008 |
| WO | 2010/025159 A1 | 3/2010 |
| WO | 2010/19983 A1 | 12/2010 |
| WO | 2011/154676 A1 | 12/2011 |
| WO | 2012/059736 A2 | 5/2012 |
| WO | 2013/011283 A2 | 1/2013 |
| WO | 2014/118523 A1 | 8/2014 |

OTHER PUBLICATIONS

British Search Report dated Sep. 16, 2014 in corresponding British Patent Application No. GB1404328.5.

RTL Materials Ltd., "Rolatube Technology Technical Briefing," Mar. 9, 2012, pp. 1-13.

Rolatube Technology: "A short video which explains the key characteristics of this game changing technology," May 14, 2012, retrieved from the Internet: URL:https://www.youtube.com/watch?v=DGxDYxgl6g [retrieved on May 4, 2015], Youtube Video.

* cited by examiner

METHODS OF DEPLOYING FIBRE OPTICS VIA A COILABLE MEMBER FOR SENSING OR COMMUNICATIONS APPLICATIONS

This application is a national phase filing under 35 U.S.C. § 371 of International Patent Application No. PCT/GB2015/050716, filed Mar. 11, 2015, which claims the benefit of British Patent Application No. 1404328.5, filed Mar. 12, 2014, each of which is incorporated herein by reference in its entirety.

The present invention relates to methods of deploying fibre optic assemblies and fibre optic assemblies, including a method of deploying a sensor assembly, a method of sensing and a structure and sensor assembly in combination, a method of deploying a fibre optic assembly for a communication network, a method of configuring a communication network including a fibre optic assembly and a method of communicating.

Fibre optics are useful in many scenarios. However, a major drawback in the use of fibre optics currently is the difficulty in deploying the fibre optics, which typically presents a time consuming task for a trained operator. In particular, it is generally desirable to control the position and/or tension applied along the fibre optic, for example to keep the fibres free from local, tight radius bends or kinks, and protected from undesirable effects from the environment, or the performance of the fibre optics may suffer. This is particularly a problem for relatively long lengths of fibre optics where significant amounts of light may be lost if the fibre optics are not carefully installed. Splicing together and/or connecting to fibre optics also present challenges. Currently, if it is desired to splice into or connect to a fibre optic cable somewhere along its length, the cable must be cut and the protective layer removed by a solvent or burned-off to expose the fibre end, which must then be cleaned before the connection can be made. Existing methods are time consuming and difficult to apply. The present invention in its various aspects generally seeks to make improvements in the deployment of fibre optic systems.

For instance, one known use of fibre optics is in sensing. There are many applications where it is desirable to measure some property associated with a structure, such as a beam or a pipe or a girder, or a concrete structure or part of a building or infrastructure project, etc. For example, it may be desired to measure the temperature of a structure, or the pressure experienced by a structure or the stress or strain or vibration experienced by a structure. This may be done to ascertain the operating conditions of the structure, or as a way of monitoring the structure for signs of damage or signs indicative of imminent failure of the structure, etc.

To this end, in conventional schemes, a skilled operator may visit the structure to install fibre optic sensors wherein one or more fibre optic cables are in some way coupled to the structure, e.g. by attaching the fibre optic sensor to the structure or forming the structure around the fibre optic cable. The fibre optic sensor experiences stresses/strains induced by changes in the properties of the structure, which affect how light is transmitted in the fibre. A measurement system can monitor the light passing through the fibre optic and perform calculations which detect various properties of the structure to which the fibre optic cable is coupled, e.g. temperature, pressure, displacements.

A problem with deploying sensors of this type is that it is necessary to precisely control position and/or tension of the fibre optic cable in order for the measurements to be accurate. Moreover the cable can be delicate, sensitive to breaking under moderate strains, and require careful handling. Currently, the cable must be deployed in situ at the place it is required to sense the structure. For example, it is currently known for the fibre optic cable to be attached between two brackets and tensioned in situ and then to infill the space with concrete or similar building material. Thus, the fibre can sense the structure formed by the concrete when set. However this method of installation can take a highly skilled worker many hours of work, which holds up construction work. In a major infrastructure project, it may be desired to deploy very many sensors. Thus, there is a major disincentive to take up of this type of sensing. Similar problems are known with other strain-based sensors, such as electrical strain gauges and the like.

Aspects of the present invention aim to provide improved methods of deploying a sensor assembly, methods of sensing and sensor assemblies and structures including a sensor assembly.

Another known user of fibre optics is for communication networks. Optical fibre is used by many telecommunications networks to transmit telephone signals, Internet communication, and cable television signals and the like. Typically optical fibres deployed in such networks are clad in plastic to protect the fibre to create cables with one or more fibre optic strands. Due to much lower attenuation and interference, optical fibre has advantages over existing copper wire in long-distance and high-demand applications. However, fibre-optic systems are currently complex and expensive to install and operate, limiting uptake. Many existing systems use fibre optic for only the long distance sections of the network and then use copper wiring for connection to and within individual buildings.

As will be known by one skilled in the art, sharp bends and other distortions in the fibre optic cause increased loss of light. There is a minimum bending radius for any fibre, at which point it become significantly lossy. This may not be a problem for short lengths of cable, for example between audio devices in a music system, but becomes a significant problem in long distance cables where the signal may degrade unacceptably over the length of the cable. It is usually necessary to include amplifiers and or signal reconditioners periodically along a long cable to address this problem, which leads to a major added expense. Thus, for long distances, it is generally desirable to carefully control the positioning and/or tension applied to the cable to generally keep the cable as free from sharp bends as possible, e.g. as straights as possible, to limit losses and reduce the number of amplifiers or signal reconditioners needed along the route.

When fibre optic networks are laid over distances, this might typically comprise transporting a reel of fibre optic cable to the site, digging a trench for the cable, for example at the side a road or rail track, laying the fibre optic cable from the reel, and back filling the trench so as to bury the cable. However, even when the cable is carefully positioned initially, the act of back filling the trench can cause the cable to shift and loose its desired positioning. Furthermore, if the fibre network extends directly to subscriber premises, adding a new user to the network typically requires splicing into the cable next to the user's premises, installing a splitter so that a link to the user's building can be laid, and installing an access box so that the splitter can be accessed in future. Splicing into fibre optic cable at arbitrary points creates further challenges.

When fibre optic cables are laid within buildings to create a network, existing cables have further limitations. In particular, it is often necessary to provide ductwork or other supporting structure for the cables both to protect them and support them in position. In particular, the flexible nature of cables means they do not support their own weight well, making "free air" stretches of cable impractical in many cases. Feeding cables through difficult to access spaces where there are obstructions, such as under floorboards, is also problematic as the cables cannot be "pushed" or guided effectively.

Aspects of the present invention aim to provide improved methods of deploying a fibre optic assembly for a communication network, a method of communicating in a communication network, a method of configuring a communication network including at least one fibre optic assembly, a fibre optic assembly, and a method of manufacturing the fibre optic assembly.

According to a first aspect of the present invention, there is provided a method of deploying a sensor assembly for sensing a property associated with a structure of interest, the sensor assembly comprising:

an elongate member constructed and arranged so as to be configurable between a coiled form and an extended form, wherein when coiled the member is wound about an axis extending transversely to the longitudinal extent of the member, and wherein when extended the member is resiliently biased in that form; and, at least one sensor disposed along at least a part of the longitudinal extent of the member, wherein at least a part of the sensor is fixed to the member such that the elongate member in its extended form controls the position and/or tension of that part of the sensor such that strains experienced by the member are transmitted to the sensor as required for sensing, the method comprising:

uncoiling the elongate member and positioning the sensor assembly; and then, forming the structure of interest around the sensor assembly or introducing a filler material in the space between the sensor assembly and the structure of interest such that the sensor assembly is coupled to the structure and the property of the structure can be sensed by the sensor.

The elongate member is coilable, which allows a potentially lengthy sensor to be in coiled form for storage or transportation prior to deployment. The sensor assembly can be uncoiled at the site where it is to be deployed. The act of uncoiling places the elongate member into an extended form in which it is resiliently biased. At least part of the sensor is fixed to the member such that there is a strong mechanical coupling between them, preferably over the full length of that part of the sensor, such that strains and stresses can be transmitted from the member to the sensor and thereby sensed using the sensor. The strong coupling between the sensor and the member automatically controls the positioning and/or tension of the sensor as desired. For example, parts of the sensor may be "pulled" into a straight line or line parallel with the longitudinal axis of the member or other paths alone the member that are free from sharp local bends, i.e. removes any slack and keeps the sensor taut, which generally desirable for taking accurate measurements.

The member preferably has a high degree of linearity so as to provide a surface or body which is free from sharp local bends or irregularities to provide a smooth substrate for supporting the sensor. The stiffness of the member when extended is sufficient to achieve the desired positioning and/or tensioning of the sensor.

Due to the coupling between the sensor assembly and the structure, the sensor assembly analogously experiences the properties being measured in the structure, e.g. displacements, temperature, vibrations, etc. are transmitted to the sensor assembly, and more particularly, via the member to the sensor. This provides a simple to operate and low cost way of deploying a sensor assembly to sense a property of interest associated with a structure, and is especially advantageous for used with large scale building and civil engineering projects where it is desired to sense may properties of the structure or foundations of a project. The member also protects the delicate sensor. The sensors can be deployed rapidly by relatively unskilled persons with less risk of damage occurring to the sensors.

The member being elongate means that the structure can be sensed along a length of the structure due to the longitudinal extent of the member being substantially greater than the transverse extent of the member when in the structure-engaging form. This means that a single sensor assembly requiring a single fitting operation to the structure can be used to monitor a substantial length of the structure over period of time. The particular longitudinal extent of the member is determined by the desired application of the sensor assembly. Nonetheless, in preferred embodiments the longitudinal extent of the member may at least 5 times, or at least 10 times, or at least 50 times, or at least 100 times the transverse extent of the member when in the structure engaging form. A member may be 10s or 100s of meters long for instance.

Thus this provides a convenient way of monitoring a length of structure, where the sensor assembly can be retrofitted to the structure, or fitted to the structure at the time of installation of the structure, or even incorporated to the structure at the time of construction, as desired.

In principle, any suitable type of sensor can be used, such as for example fibre optic sensor systems that are known per se and as described below. Other types of sensors, such as strain gauges or any other suitable sensor may be used in other aspects. The sensor or sensors can extend the full length of the sensor assembly or at least a substantial portion thereof. The sensor or sensors can be run continuously longitudinally along the member or a portion of the member (such as a continuous length of fibre optic sensor). The sensor or sensors may run axially along the member, or be curved with respect to the axis of the member.

In an embodiment, the elongate member has a relatively planar transverse cross section in its coiled form and a relatively non planar transverse cross section in its extended form to provide stiffness in the extended form to tension the sensors.

Forming the structure of interest may comprise casting a settable material or particulate material around the sensor assembly. Alternatively or additionally, introducing a filler material may comprise introducing a settable material, or a particulate material between the structure and the sensor assembly. Examples of suitable materials are concrete, cement, or mastic for the settable materials and sand or earth or gravel for the particulate material. Thus, the embodiments can monitor concrete structures, or earth movements being incorporated into the structures as they are built. Alternatively, a shaft could be created in an already build structure, in which the sensor assembly can be introduced and back filled. In embodiments, the member is not clipped onto in into the structure of interest, but is deployed before being coupled to the structure by an infilling step.

In preferred embodiments, the elongate member comprises a fibre reinforced composite material. This provides a particularly convenient way of making the sensor assembly.

The member may be formed from a sheet-like material having first and second longitudinal edges that is folded in on itself longitudinally to form a tube or a longitudinal section of a tube when the member is in the extended form.

The member may be constructed such that, in transverse cross section, the extended form of the member subtends any one from a wide range of angles. As will be appreciated, the angle can be chosen to be relatively small, but should be large enough to give stiffness to the extended member to aid in deployment and control the positions and/or tensions of the sensors running along the member. For example, an angle greater than 20 degrees will be preferred in most cases. Using a larger angle can be useful in some cases to give additional stiffness. The angle can be 360 degrees or more, so the edges meet or overlap allowing a "closed" tube to be formed, which may be desirable in some situations. However, in some embodiments, the angle may be between 45 and 170 degrees. Preferably in transverse cross section the extended form of the member is generally curved.

The member may be formed from a bistable material having a first stable form when it is in the coiled form and a second stable form when it is in the extended form.

In embodiments, the member is formed from a laminate of at least two layers and said sensor is fixed between two of the layers. Alternatively, the sensor can be bonded or wrapped in place on the elongate member.

In an embodiment, the longitudinal path of the elongate member naturally conforms to the shape of the structure of interest. In other words, the shape of the sensor assembly matches the shape of the structure without any external forces being applied to deform it. The longitudinal path may be linear, longitudinally curved, helical, circular, ellipsoid. For example, a circular or helical sensor assembly may be chosen to monitor the circumferential structure of a tunnel, whereas a linear or curved sensor assembly may be chosen to monitor the longitudinal extent of the tunnel.

In an embodiment, said part of the sensor that is fixed to the member is taut when the member is extended. Thus, there is no initial "slack" in the sensor, so that any increase in strain in the member immediately transfers to an increase in strain in the sensor which can immediately be measured. In some embodiments, it may be desirable to give a pre-tension to the sensors, e.g. during manufacture of the assembly, so that negative strains induced in the member when deployed can transferred to the sensor without it going slack so they can be measured.

In an embodiment, another part of the sensor disposed along the member or at least part of another sensor disposed along the member is not taut when the member is extended and is not fixed to the member so as to be movable relative to the member. As described herein, this can provide various advantages, such as providing a convenient point to join to the sensor and for compensation for the effects of temperature on other readings.

The member may be formed from a laminate of at least two layers and said sensor is fixed between two of the layers, wherein the laminate contains at least one pocket where the layers are not laminated in which the sensor is not taut and can move relative to the member. This provides a convenient way of manufacturing a sensor assembly where some parts of the sensor are desired to be strongly coupled to the member, such that strains are transferred, and other parts of the sensor are desired to be uncoupled or loosely coupled so that the sensor can move.

Said part of the sensor that is not taut and that can move relative to the member may form a loop or coil.

Said part of the sensor that is fixed to the member may be parallel to the longitudinal axis of the member.

In another embodiment, wherein said portion of sensor that is taut is more angled with respect to the longitudinal axis of the member relative to said portion of the sensor that is not taut and that can move relative to the member. This allows different parts of the sensor to experience different strains for a given overall longitudinal strain on the member depending on the sensor's orientation with respect the longitudinal axis of the member.

The sensor follows a repeating curved path relative to the longitudinal axis of the member. The sensor may follow the path of a sinusoid relative to the longitudinal axis of the member. This is a convenient path for the sensor to follow to achieve a smooth, periodic curvature along the extent of the member.

In an embodiment, portions of the sensor are more angled with respect to the longitudinal axis of the member relative to other portions of the sensor that are less angled with respect to the longitudinal axis of the member, wherein longitudinal portions of the member to which the more angled portions of sensor are fixed have a lower modulus relative to other longitudinal portions of the member to which less angled portions of the sensor are fixed. The higher the angle of the sensor with respect to the longitudinal axis of the member, the less strain the sensor experiences for a given axial load on the member. Thus, the more angled portions see a reduced strain than if they were aligned with the longitudinal axis. The less angled portions (i.e. those closer to being parallel with the longitudinal axis) coincide with portions of the member that have a higher modulus. Thus, referring to the well known relationship of "modulus=stress/strain", these portions of the member receive a lower strain than the portions with the lower modulus, meaning that, in turn, the less angled portions of the sensor experience a lower strain than if these portions of the member did not have a higher modulus. In this way, the strain on both portions the sensor for a given load can be controlled as needed to guard against exceeding the breaking strain on a sensor. Furthermore, because the different portions of the sensor react differently to a given overall strain on the member, this can be used to compensate for the affects of temperature variation in other readings, or to compensate for other factors when reading the temperature.

The sensor may have has plural parts forming said loops or coils at spaced intervals along the member with a taut part between each loop. for example, the sensor assembly may be loops or coils at regular distances between 50 cm and 10 meters e.g. every 1 meter. Thus, the sensor assembly can be manufactured in long lengths and cut to size for the application in advance or as and when required on site, which has the benefit of reducing manufacturing costs and storage. In practice the interval will be optimised for the particular use and may be irregular, e.g. a length with spacings of 1 meter may be followed by a length with spacing of 10 meters or a significant length with no loops.

The method may comprise attaching electronic apparatus to the sensor assembly in communication with the sensor arranged to provide at least one of: i) a data logging system to allow readings from the sensor to be logged system and ii) a data transmitting system to allow readings from the sensor to be transmitted remotely.

According to a second aspect of the present invention, there is provided a method of sensing a property associated with a structure of interest using a sensor assembly, the method comprising:

deploying the sensor assembly to the structure of interest according to the methods described above; and then, sensing a property associated with the structure.

Sensing with the sensor may comprise at least one of:
a) sensing temperature;
b) sensing pressure;
c) sensing vibration;
d) sensing stress; and
e) sensing strain
of the structure.

The method may comprise separating the effects of temperature variation from a property other than temperature associated with the structure by sensing with at least a part of the sensor that is fixed to the member and with a part of the sensor or another sensor that can move relative to the member.

According to a third aspect of the present invention, there is provided a structure having embedded within or coupled thereto a sensor assembly, the sensor assembly comprising:

an elongate member constructed and arranged so as to be configurable between a coiled form and an extended form, wherein when coiled the member is wound about an axis extending transversely to the longitudinal extent of the member, and wherein when extended the member is resiliently biased in that form; and, at least one sensor disposed along at least a part of the longitudinal extent of the member, wherein at least a part of the sensor is fixed along at least a part of the longitudinal extent of the member such that the elongate member in its extended form controls the position and/or tension of that part of the sensor so that strains experienced by the member are transmitted to the sensor as required for sensing, wherein the structure of interest is formed around the sensor assembly or a filler material occupies in the space between the sensor assembly and the structure of interest such that the sensor assembly is coupled to the structure and the property of the structure can be sensed by the sensor.

According to a fourth aspect of the present invention, there is provided a method of deploying a fibre optic assembly for a communication network, the fibre optic assembly comprising:

an elongate member constructed and arranged so as to be configurable between a coiled form and an extended form, wherein when coiled the member is wound about an axis extending transversely to the longitudinal extent of the member, and wherein when extended the member is resiliently biased in that form; and, at least one fibre optic, at least a part of which is coupled to the member along at least a part of the longitudinal extent of the member, the method comprising:

uncoiling the elongate member and positioning the fibre optic assembly.

This provides a convenient and cost effective way of installing fibre optics for a communications system. The assembly can be stored and then transported to the installation site in its coiled, i.e. compact, form. The assembly can then be deployed by extending the member, which provides a substrate to support and protect the fibre optic in whichever environment it has been installed.

In an embodiment, the elongate member in its extended form controls the position and/or tension of that part of the fibre optic. The fibre optic can run linearly along the longitudinal axis of the member, or can curve. The fibre optic can be kept taut, or given a pre-tension if desired. The member preferably has a regular/linear surface which provides a linear substrate for the fibre optic and has the desired amount of stiffness for the particular applications to keep the fibre optics at the desired position and/or tension.

The method may comprise, after positioning the fibre optic assembly, then in-filling around the fibre optic assembly. The elongate member helps position and protect the fibre optic in this embodiment.

Positioning the fibre optic assembly may comprise pushing the fibre optic assembly into a confined space, wherein the stiffness of the elongate member allows the assembly to be pushed into position. This reduces the need to disrupt the existing infrastructure to permit access to the space where the assembly will run.

The method may comprise progressively unwinding the assembly and pushing it into position. This is useful where access is restricted as the coiled form of the assembly is conveniently compact.

Positioning the fibre optic assembly may comprise supporting the assembly at first and second positions, such that at least a portion of the assembly between the first and second positions in unsupported, wherein the stiffness of the member prevents the assembly from sagging between the first and second positions. Thus, unlike cables, the assembly can span "free air" without sagging and risk of being snagged, damaged, etc.

In an embodiment, the elongate member comprises a fibre reinforced composite material.

In an embodiment, the member is formed from a sheet-like material having first and second longitudinal edges that is folded in on itself longitudinally to form a tube or a longitudinal section of a tube when the member is in the extended form.

In an embodiment, the member is formed from a bistable material having a first stable form when it is in the coiled form and a second stable form when it is in the extended form.

In an embodiment, member is formed from a laminate of at least two layers and said fibre optic is disposed between two of the layers.

In an embodiment, the fibre optic has at least one part forming a loop or coil in a pocket along the member, wherein the loop or coil is not coupled to the member.

In an embodiment, a wirelessly detectable tag or marker is fixed to the member proximate the loop or coil.

In an embodiment, a resilient material is disposed between the fibre optic and the member to resiliently couple the fibre optic to the member. The resilient material resiliently couples the fibre to the member. This means that the member can still position and/or tension the fibre as desired. However, in a communication system, unlike the sensing scenario describe above, it is generally not desirable for stresses/strains from the environment to impact on the fibre optic and so influence its ability to transmit light. The resilient coupling can help attenuate or eliminate transmission of any strains on the member from reaching the fibre optic.

In an embodiment, an optical interface is attached to one or both free ends of the fibre optic for interfacing with the communication network.

According to a fifth aspect of the present invention, there is provided a method of communicating in a communication network, the method comprising:

deploying the fibre optic assembly according to the method describe above; and then, communicating over the network.

According to a sixth aspect of the present invention, there is provided a method of configuring a communication network including at least one fibre optic assembly, the fibre optic assembly comprising:

a method of configuring a communication network including at least one fibre optic assembly, the fibre optic assembly comprising:

an elongate member constructed and arranged so as to be configurable between a coiled form and an extended form, wherein when coiled the member is wound about an axis extending transversely to the longitudinal extent of the member, and wherein when extended the member is resiliently biased in that form; and, at least one fibre optic, at least a part of which is coupled to the member along at least a part of the longitudinal extent of the member, wherein the fibre optic has at least one part forming a loop or coil in a pocket along the member, wherein the loop or coil is not coupled to the member, the position of the loop or coil being marked with a wirelessly detectable tag or marker, the method comprising:

wirelessly detecting the tag or marker;

accessing the loop or coil located by wirelessly detecting the tag or marker; and, breaking fibre optic at the loop or coil and connecting to one or both ends of the fibre optic.

This provides a convenient way of for example adding subscribers to an already installed fibre optic network, providing places where the fibre optic can be split and joined to and allowing these places to be identified where the fibre optic is buried or otherwise concealed, thus minimising how much of the cable must be exposed.

According to a seventh aspect of the present invention, there is provided a fibre optic assembly, comprising:

an elongate member constructed and arranged so as to be configurable between a coiled form and an extended form, wherein when coiled the member is wound about an axis extending transversely to the longitudinal extent of the member, and wherein when extended the member is resiliently biased in that form; and, at least one fibre optic parts of which are coupled to the member along at respective parts of the longitudinal extent of the member, wherein another part of the fibre optic forms a loop or coil that is not coupled to the member between two parts of the fibre optic that are coupled to the member.

The loop or coil provides a convenient way of splitting/joining the fibre optic by cutting the member coinciding with a coil and then exposing the loose, uncoupled end of the fibre. The uncoupled loop or coil can also be used to compensate for temperature in measurement using the fibre optic as a sensor as described elsewhere in this application.

The member may be formed from a laminate of at least two layers and said fibre optic is fixed between two of the layers, wherein the laminate contains at least one pocket where the layers are not laminated in which the fibre optic is not coupled to the member.

In an embodiment, the fibre optic has plural parts forming said loops or coils at spaced intervals along the member with a part fixed to the member between each loop or coil.

In an embodiment, the assembly comprises one or more tags or markers fixed to the member proximate one or more respective loops or coils, the tags or markers being constructed and arranged to be detected wirelessly to allow the loop or coil to be located.

In an embodiment, the elongate member in its extended form controls the position and/or tension of the coupled part of the fibre optic.

In an embodiment, the coupled part of the fibre optic is fixed to the member such that strains experienced by the member are transmitted to the fibre optic sensor as required for sensing. This allows the assembly to be used as a sensor assembly. As will be appreciated from the following description, the whole length of the fibre can be coupled to the member in some embodiments, or parts of the fibre can be coupled to the member in other embodiments. A modified section of the fibre can be coupled to the member, such as a Fibre Bragg Grating, or an unmodified optical fibre can be coupled to the member, which can be used with techniques such as Ramen, Rayleigh and Brillouin backscattering of the laser light.

In an embodiment, a resilient material is disposed between the fibre optic and the member.

In an embodiment, said part of the fibre optic that is coupled to the member extends linearly along the member parallel to the axis of the member.

According to an eighth aspect of the present invention, there is provided a sensor assembly comprising:

an elongate member constructed and arranged so as to be configurable between a coiled form and an extended form, wherein when coiled the member is wound about an axis extending transversely to the longitudinal extent of the member, and wherein when extended the member is resiliently biased in that form; and, at least one sensor disposed along at least a part of the longitudinal extent of the member, wherein a first portion of the sensor is more angled with respect to the longitudinal axis of the member relative to a second portion of the sensor that is less angled with respect to the longitudinal axis of the member, wherein at least the first portion of the sensor is fixed to the member such that the elongate member in its extended form controls the position and/or tension of that portion of the sensor such that strains experienced by the member are transmitted to the sensor as required for sensing, wherein either:

(i) the second portion is not taut and can move relative to the member, or (ii) the second portion is fixed to the member, and the longitudinal portion of the member to which the second portion is fixed has a higher modulus relative to the longitudinal portion of the member to which the first portion is fixed.

This arrangement of the sensor allows the overall assembly to undergo strains in excess of the breaking strain of the sensor itself. The angled portions of the sensor see less strain due to their angle with respect to the longitudinal strain axis. The less angled portions are further protected from the affects of strain by being decoupled from the member or giving that portion of the member a higher modulus. Where the sensor is decoupled from the member, the various portions of the sensor to react differently to temperature changes and stress/strains induced from the environment, allowing a single sensor to be used to separate temperature readings from other readings, e.g. vibration, stress and strains in the underlying structure to which the assembly is coupled.

Both portions of the sensor thus experience a lower strain for a given axial load on the member, which helps guard against exceeding the breaking strain of the sensor (e.g. typically 2% or so where a fibre optic sensor is used) in applications where it is anticipated that the member may otherwise undergo strains in excess of the breaking strain of the sensor. This can be used in sensing applications where the assembly is coupled to the structure of interest by burying or infilling around the sensor assembly. This can also be used in applications where the sensor assembly is clipped to the structure of interest, such as oil risers, as for example described in WO2010/139983 and WO2012/059736.

In an embodiment, the sensor assembly comprises a plurality of said first portions and a plurality of said second portions, the first and second portions alternating such that the sensor follows a non-linear path along the member relative to the axis of the member.

In an embodiment, the sensor follows the path of a sinusoid relative to the axis of the member.

In an embodiment, the second portion of the sensor is formed in a pocket in the member.

According to a ninth aspect of the present invention, there is provided a method of manufacturing the fibre optic assembly or sensor assembly described above, comprising:

applying a release film to the opposing surfaces of the layers forming the member in the region of the pockets;

positioning the fibre optic or sensor between the layers; and, lamination the layers, wherein the release film is arranged so that layers are not laminated together in the region of the pocket so the fibre optic or sensor is not coupled to the member in the pocket.

According to a tenth aspect of the present invention, there is provided a method of manufacturing a fibre optic assembly or sensor assembly as described above, comprising cutting a portion of the elongate member coinciding with a pocket; and, removing the looped or coiled part of the fibre optic or sensor from the pocket at the cut; and, configuring the end of the loop or coil part to be connected to an optical or electrical interface.

It will be appreciated that any features expressed herein as being provided "in an example" or "in an embodiment" or "may be provided" or as being "preferable" may be provided in combination with any one or more other such features together with any one or more of the aspects of the present invention.

Embodiments of the present invention will now be described by way of example with reference to the accompanying drawings, in which.

Figure 1:
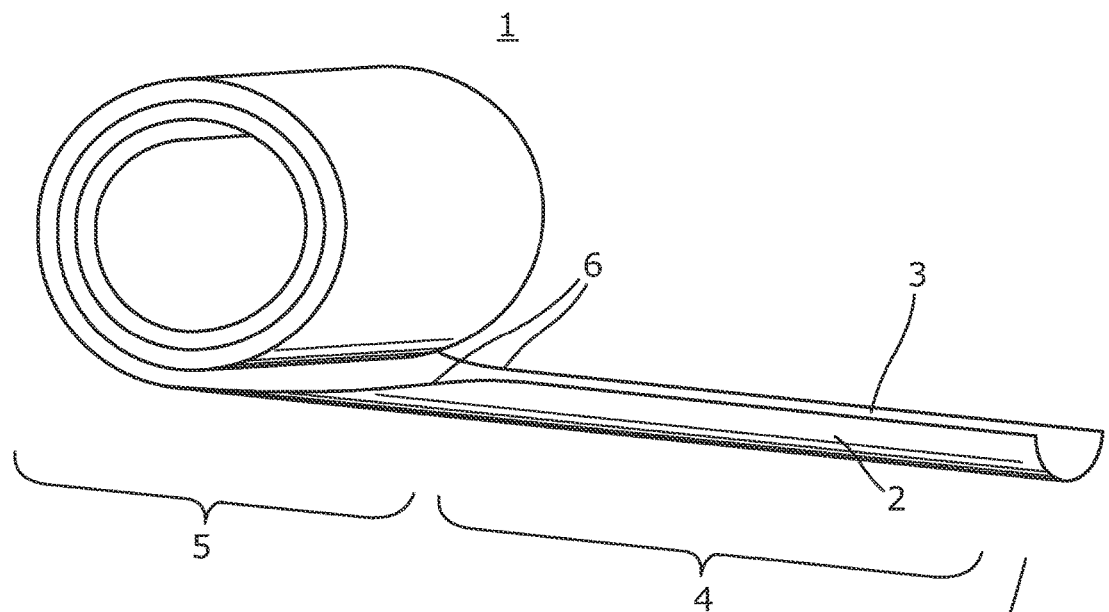
FIG. 1 shows an example of a sensor assembly according to an embodiment of the present invention in some aspects.

Referring to FIG. 1, an example is shown of a fibre optic assembly 1 according to an embodiment of the present invention which can be used for various applications, such as, in aspects, sensing or communications. The apparatus 1 comprises an elongate member 2. The member is formed of a strip of sheet-like material, i.e. the member is thin in cross section. The thinness of the material will in practice depend on the application of the fibre optic assembly 1. Nonetheless, in preferred embodiments the member may be less than 5 mm, or less than 2 mm, or less than 1 mm thin in cross section. It is anticipated that in most cases the thinness of the member compared to the width of the member with deployed may be less than 4%. In some examples (not shown) additional layers may attached to the member 2 for various other purposes, such as floatation layers or layer providing protection from impact damage. These addition layers may give rise to higher overall thickness in the fibre optic assembly 1.

The member 2 as depicted has an extended portion 4 and a coiled portion 5. The member 2 is capable of being progressively transformed between being completely coiled and being completely extended. The length of the member 2 (i.e. its longitudinal extent) when fully extended is substantially greater than its width (i.e. its transverse extent) when extended. The preferred length will in practice depend on the application chosen for the fibre optic assembly 1. Nonetheless, in preferred embodiments the length of the member 2 may at least 5 times, or at least 10 times, or at least 50 times, or at least 100 times the width of the member 2.

Figure 2:
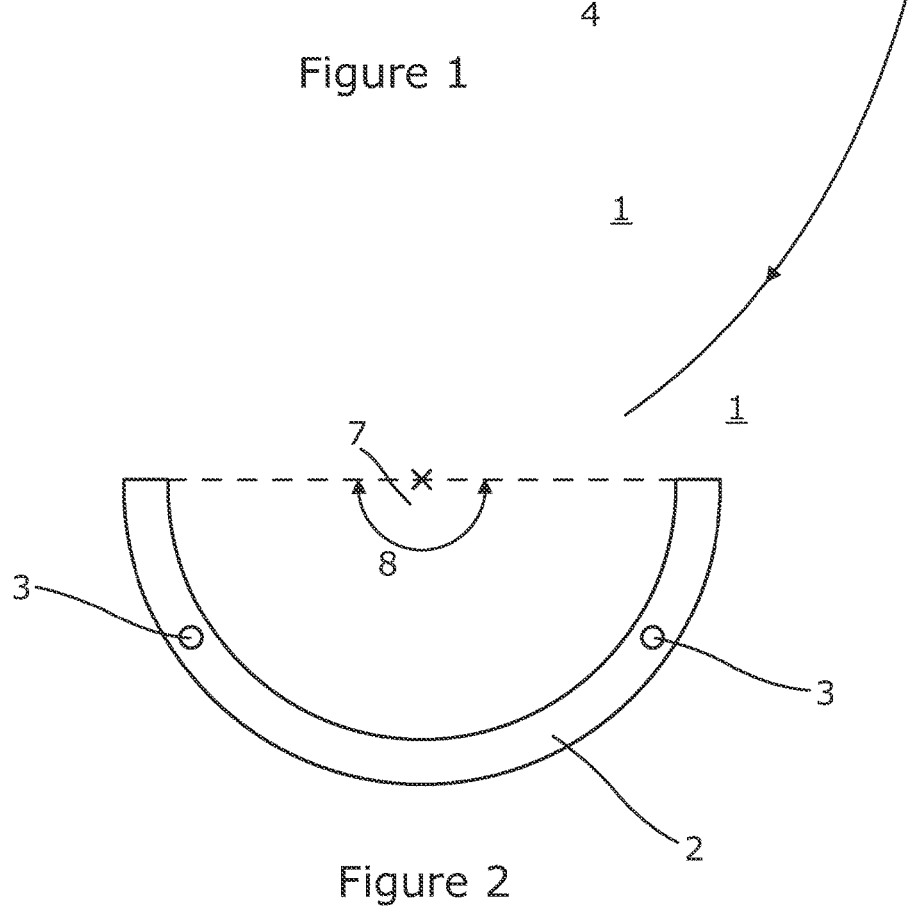
FIG. 2 shows a cross section of the sensor assembly of FIG. 1.

FIG. 2 shows a cross section through the extended portion 4. One or more fibre optics 3, two fibre optics being used in this example, are provided running along the length of the elongate member 2 and coupled to the elongate member 2.

As shown in more detail in FIG. 2, the extended portion 4 is resiliently biased to have a cross section that is curved in the form of a partial circle. Thus the extended portion forms a slit tube. The partial circle subtends an angle 8 of about 180 degrees. In other words, from the centre of the circle 7, the member 2 sweeps out a partial circle over an angle 8 of about 180 degrees. However, may other angles possible. As will be appreciated, the angle can be chosen to be relatively small, but should be large enough to give sufficient stiffness to the extended member to aid in deployment and to straighten the optical fibres running along the member. For example, an angle greater than 20 degrees will be preferred in most cases. Using a larger angle can be useful in some cases to give additional stiffness. The angle can be 360 degrees or more, so the edges meet or overlap allowing a "closed" tube to be formed, which may be desirable in some situations. However, in embodiments, the angle may be between 45 and 175 degrees to give a reasonable compromise between stiffness and unnecessary material being used.

It is not essential to have a circular cross section. The cross section may have straight portions whilst being generally curved. Ovals and other continuous, non-circular arcs can also be produced.

The member 2 when extended is resiliently biased in this form so that it provides a stiff substrate for the fibre optic fixed to the member. Thus, this arrangement preserves the desired degree of linearity, curvature and/or tension in the fibre optic, so that this is optimised for the purpose at hand without any requirement to post tension or locally position the fibre in-situ. As will be discussed below, various methods of bonding and fixing the fibre to the member can be used to create a higher or lower degree of mechanical coupling between the fibre and the member according to the application intended for the fibre. For example, in a sensing application, a strong degree of coupling is provided for at least some portions of fibre optic so the stresses and strains experienced by the member are transmitted to these portions of the fibre optic so they can be measured.

As will be appreciated by those skilled in the art, it is desirable in many applications to apply tension to the fibre optic cable to take up possible slack in the fibre optic 3 to obtain the best performance. The bending stiffness of the member may act to tauten the fibre optic 3 or portions of the fibre optic running along the length of the member. This can be accomplished by applying a desired pre-tension to the fibre when it is incorporated into the member during manufacture. Alternatively, the fibre can lie inside or at the neutral axis of the member such that the act of uncoiling the assembly acts to take up any slack or pre-tension the fibre.

By using an extendible member, this provides a quick and simple way of deploying such a fibre optics and achieving the desired positioning and/or tensioning of the fibre optic 3 without the laborious manual configuration currently used in the prior art to achieve this. The extended member 2 of the fibre optic assembly 1 can have various forms. For example the member 2 can be linear, longitudinally curved, helical, circular, ellipsoid when extended. The form can be chosen to match the form of the space or structure where the assembly 1 is to be deployed.

For the member 2, any material of sufficient resilience to be reversibly coiled and extended, and to maintain a bending stiffness in its extended form to tauten the fibre optic 3 could be used in principle. For example, suitable elastomeric polymers and even, in cases where the in-use strain is low, spring metals, could be used for the member 2. In practice, metals are not preferred as they would have moduli significantly higher than that of the polymers.

In some embodiment, it may be desirable to provide a housing or dispenser to contain the coiled assembly 1 to constrain the stored energy in the coiled member 2 and prevent the member spontaneously uncoiling.

The use of a laminar construction with the fibre optics 3 embedded between layers of the lamina gives an advantageous combination of strain transfer, protection of the fibre from impact, abrasion etc. The layers of the laminar could be polymer, elastomer or even metallic and bonding of the sensor be achieved by adhesively laminating or by "processing in" in the case of a laminar structure that is a fibre reinforced composite (FRC). If lower mechanical coupling is desired between the fibre and the member so that less strain is transferred, a pocket or channel can be formed within the member between the layers to accommodate the fibres 3. A resilient, e.g. gel-like, substance could be deployed between the fibre and the member to further control the transfer of stresses and strains between the member and the fibre optic.

In principle, there are many different methods that are suitable to construct the fibre optic assembly 1. A particularly preferred method is to laminate the fibre optics 3 between layers of fibre reinforced polymer ("FRP" hereafter). FRPs are known per se and are not described in detail herein. However, in brief, FRPs are composite materials made of a polymer matrix reinforced with fibres. The fibres are usually fiberglass, carbon, or aramid, while the polymer is usually an epoxy, vinylester or polyester thermosetting plastic. The use of fibrous materials mechanically enhances the strength and elasticity of the plastics. The original plastic material without fibre reinforcement is known as the matrix. The matrix is a tough but relatively weak plastic that is reinforced by stronger stiffer reinforcing filaments or fibres. The extent that strength and elasticity are enhanced in a fibre reinforced plastic depends on the mechanical properties of both the fibre and the matrix, their volume relative to one another, and the fibre length and orientation within the matrix.

The fibre optics 3 can be laminated either by incorporating them at the time of consolidation, or by post bonding two or more layers of FRP shell using an adhesive to hold the shells together with the fibre optics 3 in between the layers of the laminar. The use of FRP allows the mechanical characteristics of the shell to be manipulated by varying the weight and direction of fibres in the various layers in such a manner as to produce something that can be tailored to the needs of a specific application of the fibre optic assembly 1.

Thus, a FRP is a particularly preferred material for making the member 2 as it allows fine tuning of axial/torsional/hoop stiffness to be achieved by, for example, changing the angles and fibre content of the layers. Nonetheless, other materials are possible. For example, a metal ribbon can be used and tuning of its properties can be achieved by punching holes and slots into the metal ribbon. Conventional methods can be used to make the composite or bistable member. Advantageous mechanised production methods of making a composite member are disclosed in the Applicant's GB1301637.3 filed 30 Jan. 2013.

In a preferred embodiment, the material used for the member is a bistable material, whether made of FRP or otherwise. Such a bistable member comprises an extendable, coilable member that can be reconfigured from a coiled or retracted state to an extended state. The fibre optic assembly 1 shown in FIG. 1 can be made optionally from a bistable material such that it has a first stable state in the coiled form, wherein the cross section of the member is generally flat and a second stable state in the extended form, wherein the cross section of the member is curved as previously described. Preferably, the bistable member 2 is capable of reversible configuration between its coiled and extended forms a plurality of times. Suitable structures are disclosed in the following international patent applications, each of which is incorporated here by reference: WO-A-88/08620, WO-A-97/35706, WO-A-99/62811, and WO-A-99/62812. Such bistable structures are available from RolaTube Technology Limited of Lymington, United Kingdom.

As described in the above-referenced patent applications, such a bistable member generally comprises material that creates a bias towards configuring the material in the extended form (e.g. having a circular cross-section in this example), as well as material that creates a bias opposite to the first bias (e.g. one that biases the member towards its flattened, retracted or coiled form). The member can comprise a resilient substrate, made of metal for example, which is biased toward the extended form (e.g. biased toward making the member have a circular cross-section), laminated with a plastic layer that tends to bias the member towards the retracted form (e.g. having a flattened cross-section). Alternatively, the member can comprise a strip or sheet of a thermoplastic material having prestressing means attached thereto or embedded therein. One particular example is a thermoplastic strip having prestressed fibres therein (such as fibres of glass, carbon, or polymeric materials). The fibres can be located at different angles relative to each other in the plane of the coiled member, such as comprising one set of fibres that are longitudinally extending and a second set of fibres that are transversely extending. Such fibres-reinforced composite members (e.g. a thermoplastic resin, such as polyethylene or polypropylene, with fibres of another material, such as glass, carbon, or aramid, embedded therein) are preferred for use in the present invention. N.B. the fibres described here are not the same as the fibre optics 3.

Using a bistable member 2 in this way means that the fibre optic assembly 1 is stable in its coiled form, meaning that it is easier to handle and store, etc., for example without the need for a housing or dispenser to constrain the coiled assembly 1, although such can still be used if desired.

Thus, the fibre optic assembly 1 can be transported to the location where it is to be deployed before being fully uncoiled and installed. The resiliency/stiffness of the member 2 in the extended form also acts to apply the desired, predetermined position and/or tension to the fibre optics 3 in the areas where they are coupled. This can be important in reducing losses due to bends in the fibre optic and, where desired, transmitting external stresses/strains to the fibres. Various embodiments and uses of the fibre optic assembly 1 are now described.

Figure 3:
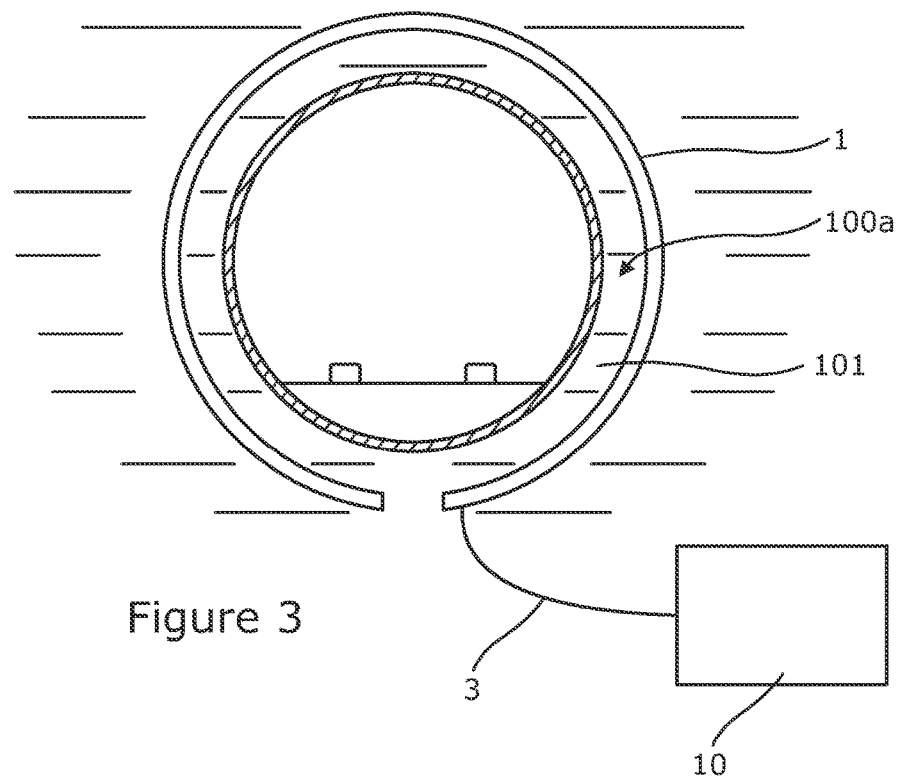
FIG. 3 shows an example of sensor assembly deployed.
Figure 4:
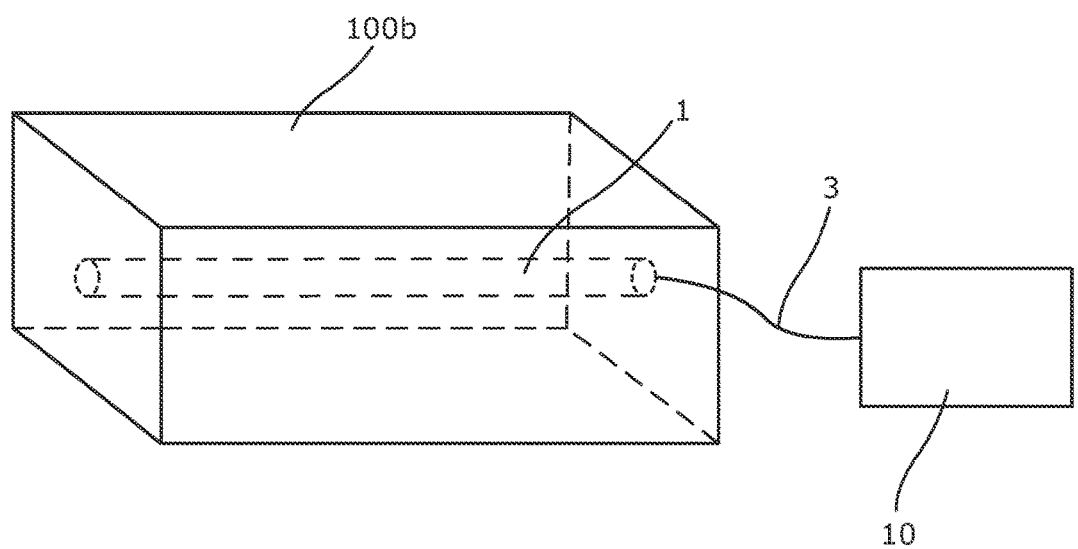
FIG. 4 shows another example of a sensor assembly deployed.

FIGS. 3 and 4 show examples of deployment of a sensor assembly 1 provided by the fibre optic assembly shown by FIGS. 1 and 2 in which the fibre optic 3 is used as a sensor to sense a property or properties of a structure of interest.

Use of fibre optics as sensors is known per se, for example for monitoring flexible pipes. A fibre Bragg grating (FBG) is a type of distributed Bragg reflector constructed in a short segment of optical fibre that reflects particular wavelengths of light and transmits others. This is achieved by creating a periodic variation in the refractive index of the fibre core, which generates a wavelength specific dielectric mirror. A fibre Bragg grating can therefore be used as an inline optical filter to block certain wavelengths, or as a wavelength-specific reflector. As well as being sensitive to strain, the Bragg wavelength is also sensitive to temperature. This means that fibre Bragg gratings can be used as sensing elements in optical fibre sensors. In a FBG sensor, a laser is used to introduce light into the fibre core and a change in the property of interest causes a shift in the Bragg wavelength which can be measured and analysed. In addition, all or part of the length of an unmodified optical fibre may be used to sense in a similar manner. For example, using the Ramen, Rayleigh and Brillouin backscattering of the laser light is a well accepted technique for the measurement of temperature, strain and vibration.

When used in a sensing scenario, it is preferred that in the fibre optic assembly 1 at least some portions of the fibre optic 3 are bonded or otherwise strongly coupled along the length of the member 2 so stresses and strains are transferred from the member to the fibre optic sensor 3. Thus, strains and stresses induced in the member from the structure of interest due to changes in the property being measured, e.g. temperature, strain, vibration, etc., are transmitted to the fibre optic sensor 3, which can be measured and analysed. It is also preferred that the portions of fibre optic 3 are tensioned, i.e. taut, when deployed. Thus, there is no "slack" in the fibre optic portion meaning that strains in the member local to the fibre optic portion are immediately transmitted to strains in the fibre optic. At the same time, most fibre optics can only tolerate a strain of about 2% before breaking. Thus, a small pre-tension is generally preferred. Various strategies for guarding against possible breakage are discussed herein below.

The sensor assembly 1 is preferably transported to the location where it is to be deployed before being fully uncoiled and coupled to the structure 100 whose properties it is desired to measure.

An electronics system 10 (shown in FIGS. 3 and 4) is provided and attached to an end of the sensor assembly 1 via a connector. Connection is normally made by the use of any one of a number of mechanical connectors used for this purpose and freely available in the open market. The electronics system 10 may include a data-logger, power supply and associated instrumentation 9 connected to the sensors 3.

The data-logger logs the outputs of the sensors 3. Alternatively or additionally, the system 10 can comprise a transmitter for relaying the sensor data to a remote receiver for analysis. Wires or connectors are left extending from the structure so connection can be formed to the sensor from the electronics 10.

FIG. 3 shows an example where the structure 100 is a tunnel 100a formed from tubular concrete ring elements. The sensor assembly 1 in this example can be fully or partially circular, or helical to match the shape of the tunnel 100a. When deploying the sensor assembly 1, the sensor assembly 1 is first uncoiled and position around the periphery of the concrete rings forming the tunnel 100a. The space around the concrete rings is then filled with earth or concrete or some other particulate or settable material 101. In this way, the sensor assembly 1 is coupled to the tunnel and forces and properties associated with the tunnel 100a are experienced analogously by the sensor assembly 1. Thus, the fibre optic sensor 3 in the sensor assembly 1, can measure local properties or changes in the local properties of the tunnel 100a.

For example, it may be desired to measure any displacement along the length of the tunnel 100a. In this case, the coupling between the sensor assembly 1 and the tunnel 100a by the filler material 101 causes the sensor assembly 1 to experience similar displacements to the tunnel 100a. The sensor assembly 1 can measure these displacements by way of changes in the strain on the fibre optic sensor 3. Similarly, the sensor assembly 1 can measure local changes in temperature, which might indicate ingress of water or damage to the tunnel 100a. Various other properties can be measured with such sensors such as pressure; vibration; noise; fluid flow; stress; etc.

FIG. 4 shows an example of a structure 100b where the sensor assembly 1 is linear and fixed in position within a space, which may be formed for instance by forming a hole in some body, e.g. digging a foundation, or building forms around the space. The space is then filled with concrete or another settable or particulate material to create the structure of interest around the sensor assembly 1. The sensor assembly 1 is thereby encased in the concrete and so coupled to the structure 100b and able to monitor properties the structure 1. The structure 100b can be anything made from concrete, such as foundations, tunnels, walls, pillars, arches, etc. Alternatively, a hole can be made in an existing structure or body in which the extended sensor assembly 1 is positioned, before the space is in-filled with filler.

Thus, the sensor assembly 1 can be advantageously used in many civil engineering projects on a large scale where it is desired to simply and inexpensively monitor structures, buildings, and other material bodies, possibly on a large scale and possibly over large time spans. The sensor assembly 1 is relatively small to store and transport due to its ability to coil. The sensor assembly 1 can then be simply extended, which automatically tensions the fibre optic sensor 3 to the correct tension for making measurements and provides protection for the delicate fibre optics. The sensor assembly 1 can then be coupled to the structure/body of interest and measurements taken. This compares with current deployment of fibre optic sensors 3 which typically involves having skilled workers attaching the fibre optic sensor between two brackets and tensioned in situ before infilling the space with concrete or similar building material. This is inconvenient, time consuming and expensive.

One or more fibre optics 3 or portions of fibre optics 3 may be unbonded or otherwise relatively weakly coupled to the member 2 compared with the strongly coupled fibre optic sensors 3 to provide one or more control portions of the fibre 3. Stresses and strains experienced by the member 2 are not transmitted to the control portions 3 as strongly as control sensor can slip relative to the member 2. For example, the fibre optic sensor 3 can be positioned within a "pocket" or channel formed in the member and/or embedded in resilient, e.g. gel-like, material that provides sufficient coupling to keep the fibre straight when extended, whilst transmitting only reduced changes in strain.

The use of a control sensor in addition to normal sensors allows the effects of changing temperature to be compensated for when measuring other properties of the structure. The strongly coupled fibre optics are affected by stresses and strains in the structure, as well as temperature changes. The loosely coupled, control sensors are not affected by stresses and strains in the structure causing elongation/bending in the member, or are affected to a lesser degree, because they can slip relative to the member, but are also affected by temperature changes. Thus, in the calculation performed, the measurement from the control sensor can be combined with the strongly bonded senor to allow the properties of the structure to be measured, such as stresses, strains, vibration, etc., whilst compensating for temperature changes experienced by the sensors over the course of measurement. Conversely, by adjusting the calculation, temperature readings can be taken using the loosely coupled sensor, whilst the effects of stress and strain changes can be compensated for by using the measurement from the strongly coupled sensors. As mentioned above, methods for calculating stress, strain, temperature, etc. using fibre optic sensors are known in the art per se, and so a detailed discussion is not given here.

Figure 10:
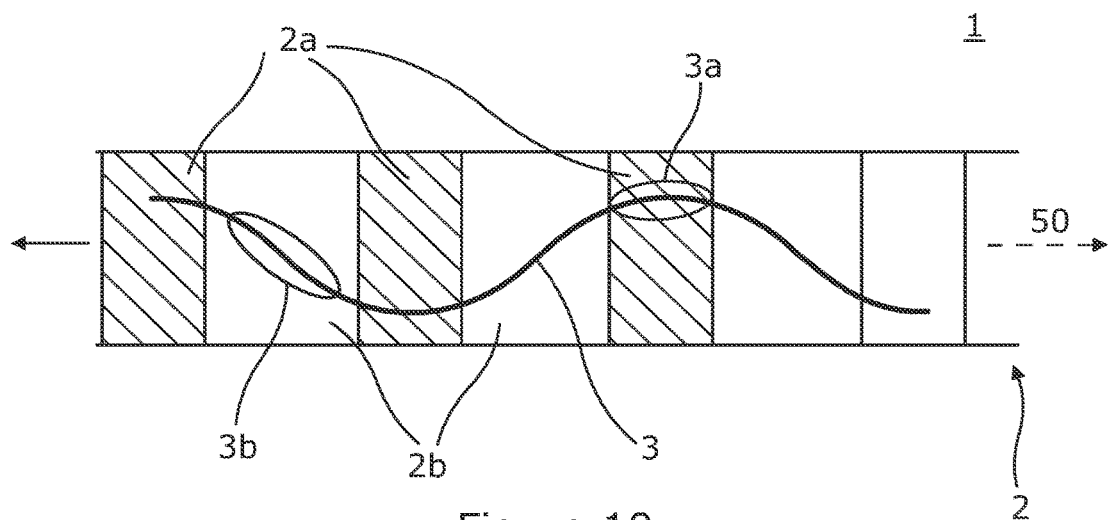
FIG. 10 shows another example of a sensor assembly.

Fibre optics typically have a relatively low maximum strain. For example many fibres will break at strains of 2% or so. This can be a problem when measuring strains in structures which are expected to a fibre optics maximum strain. FIG. 10 shows another example of sensor assembly 1, showing a different way of arranging the fibre optic sensor 3 relative to the member 2, which can be used to address this problem. The fibre optic 3 here is arranged in a sinusoid running along the member 2. Other repeating curved paths can be used.

The member 2 has reinforced areas 2b, which coincide with the sine crossovers. Thus, the member 2 is longitudinally stiffer (i.e. has a higher modulus of elasticity) at least in the portions 2b where the optic fibre 3a is most closely aligned with the longitudinal axis 50 of the member 2 compared with the other portions 2a where the optic fibre 3b is more obliquely positioned relative to the longitudinal axis. This means that for a given longitudinal stress or bending moment applied to the member, the reinforced portions 2a undergo less longitudinal strain that the other portions 2b.

In this arrangement, the oblique portions 3b of the fibre optic experience a lower amount of strain than the underlying portions of the member because of their angling relative to the longitudinal strain axis. The more aligned portions 3b experience more of strain of the underlying portions of the member, however as mentioned the strain in this portion of the member is lower due to the reinforcement. Thus, the fibre in both portions 2a,2b experiences less strain compared with a member 2 where there are no reinforcements and where the fibre runs straight down the axis of the member. This technique can be used to increase the overall strain that a member can experience without exceeding the fibre optics breaking strain.

Figure 11:
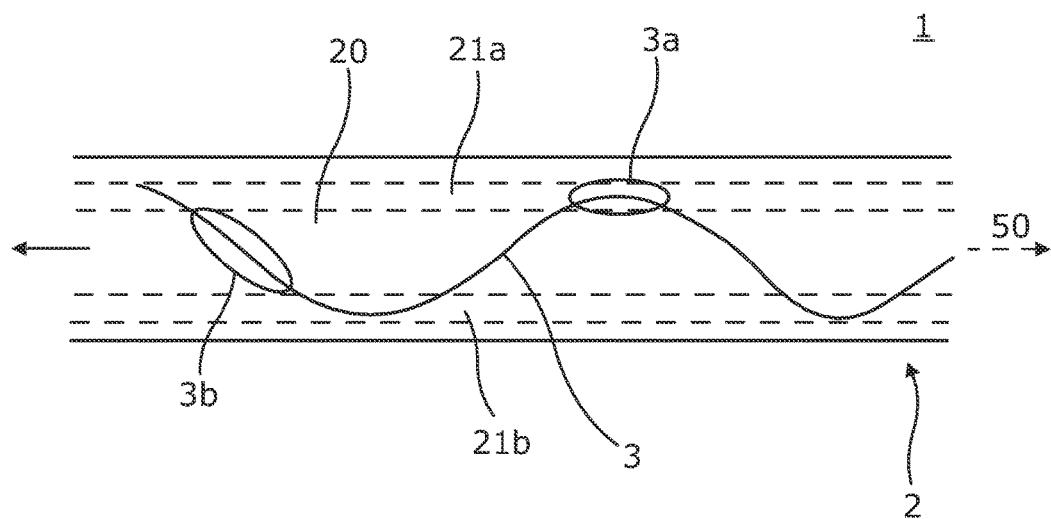
FIG. 11 shows another example of a sensor assembly.

FIG. 11 shows another example of sensor assembly 1. As in FIG. 10, the fibre optic 3 is arranged in a sinusoid running along the member 2. In this example, the aligned portions 3a of the fibre are not coupled to the member, whereas the oblique portions 3b are bonded to the fibre. In this example, in contrast with FIG. 10, there are no reinforced sections of the member.

Thus, the oblique portions 3b of the fibre optic experience a lower amount of strain than the underlying portions of the member because of their angling relative to the longitudinal strain axis. In this example, the more aligned portions 3b experience no strain due to being uncoupled to the member 2. Due to the curved path of these portions 3a of the fibre and their being able to move relative to the member, as the member experiences strain, the "slack" in these portions of fibre 3a is taken up rather than the portions of fibre experiencing the underlying strain of the member. Thus, as with the example of FIG. 10, the fibre in both portions 2a,2b experiences less strain compared with the overall strain applied to the member. This technique can be used to increase the overall strain that a member can experience without exceeding the fibre optics breaking strain.

It should also be noted that the arrangement of FIG. 11 can be used for temperature compensation. As described above in relation to other examples (e.g. FIGS. 5 to 7), the uncoupled portions of fibre do not experience strains applied to the member, whereas the coupled portions of fibre do. Both portions are affected by changes of temperature. This allows calculations to be performed on the measurements so that the affects of temperature can be separated from the affects of strains and stressed induced in the member by the structure. In other words, with appropriate calibration, it can be determined from a single fibre arranged in this way how much of the measured strain/stress is caused by variation of temperature and how much by other factors, such as vibration or shifts in the structure being measured.

Referring again to FIG. 11, longitudinal pockets 21a,21b can be formed within the member 2 in which the aligned portions 3a of the fibre are positioned so that the fibre is uncoupled to the member. During manufacture, release film or the like may be applied to opposing layers of the composite at positions corresponding to the position of the pockets before being laminated together with the fibre between the layers. In this way, the fibre is coupled to the member where the member is laminated 20, but not in the longitudinal pockets 21a,21b where the release film locally prevents the member from being laminated.

Thus, in the assemblies of FIGS. 10 and 11, those portions of the fibre that would, at the peak strain anticipated for the device, exceed the design load of the fibre in question are arranged so as to lower the strain for those portions to within acceptable limits, which can be done by raising the modulus of the member or decoupling the fibre from the member in those portions. In preferred examples, the portions of the fibre within at least 30 degrees, or 45 degrees, or more of the longitudinal axis are so arranged to lower the strain they would otherwise experience. In examples where the modulus of the member is increased, more than two different portions can be used if required, i.e. with three or more different levels of modulus corresponding to different inclinations of the fibre to control the overall strain experienced by the fibre. The modulus of the member 2 could be made to smoothly vary in line with the inclination of the fibre.

In the examples of FIGS. 10 and 11, the amplitude and pitch of the curves could be varied to provide differential strain reduction on the fibre, according to the anticipated strain profile of the underlying system to be measured. As described above, the sinusoidal fibre allows the whole assembly to be stretched to strains in excess of those that the fibre itself can experience without damage. The strain recorded on the fibre will be an average, over the distance that the laser based measuring instrument is capable of discriminating, of the strains seen in the fibre on extension of the whole device. So, the average strain seen by the fibre will be a function of the period and amplitude of the sinusoidal curve. A long period low amplitude curve will result in only a small reduction in the net strain on the fibre, a short period high amplitude curve will result in the fibre seeing proportionally less strain than the device as a whole. By changing the period and amplitude of the curve and protecting the areas of the fibre where they would otherwise experience strains above their acceptable peak, a device can be specified to measure any desired level of net strain, with the corollary that the sensitivity will be reduced in proportion to the reduction in fibre strain.

As will be appreciated, in the examples of FIGS. 10 and 11, the path of the fibre optic may differ from a sinusoid to take other curved forms. The techniques described can be applied to other paths where portions of the fibre optic are more or less angled relative to the longitudinal axis and those portions that are less angled are fixed to portions of the member with a higher modulus. A repeating curved path is preferred. A sinusoid is convenient as it is periodic and exhibits gradual changes in curvature.

Figure 8:
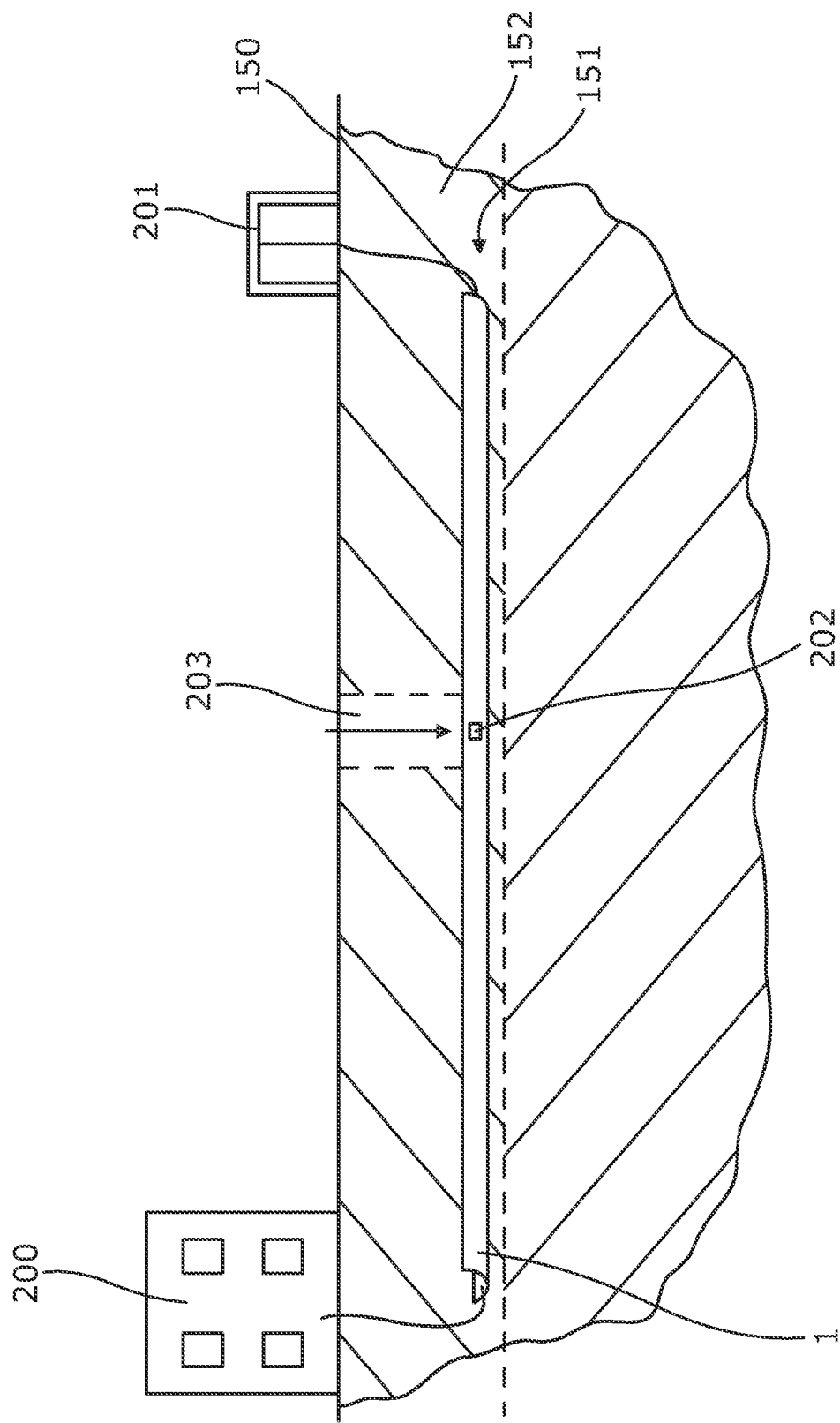
FIG. 8 shows an example of an optical fibre communication system according to an embodiment of the present invention in some aspects.

FIG. 8 shows an example of deployment of a fibre optic assembly 1 shown by FIGS. 1 and 2 in which the fibre optic 3 is used for communications. A trench 151 can be simply dug along a train track or the side of a road 150, and the fibre assembly 1 uncoiled and laid in the trench before being backfilled so as to bury the assembly 1. The stiffness of the member 2 acts to keep the fibre optic sensors 3 straight even under potential loads from the filler material 152. At the ends of the cable assembly, a length of fibre is connected to the transmitter/receiver at the termination points, such as in this example a local exchange 200 connecting to a street level cabinet 201. It may be necessary to include splitters, repeaters and/or amplifiers periodically along the length of the fibre.

The fibre assembly 1 allows fibre optic to be deployed with a desired positioning and/or tensioning, thus limiting losses. This in turn means that fewer repeaters and the like are required to recondition the signals along long lengths of the fibre optic. This then is particularly useful for long lengths of fibre optic, e.g. 10s of meters, or 100 meters or 1 km or more. In this case, the coupling between the fibre optic and the member may be looser than the sensor assembly. This is due to the fact that it is not desirable for external forces to be transmitted to the fibre optic in a communication system. In other words, it is not desired for the transmission of light in the fibre optic to be affected by environmental conditions in a communication system, as stable conditions are desired. Thus, the fibre optic 3 may be positioned within a channel or pocket in the member 2 filled with a gel-like substance which provides enough coupling to control the position and/or tension of the fibre whilst not transmitting significant strains etc. from the environment to the fibre.

Figure 9:
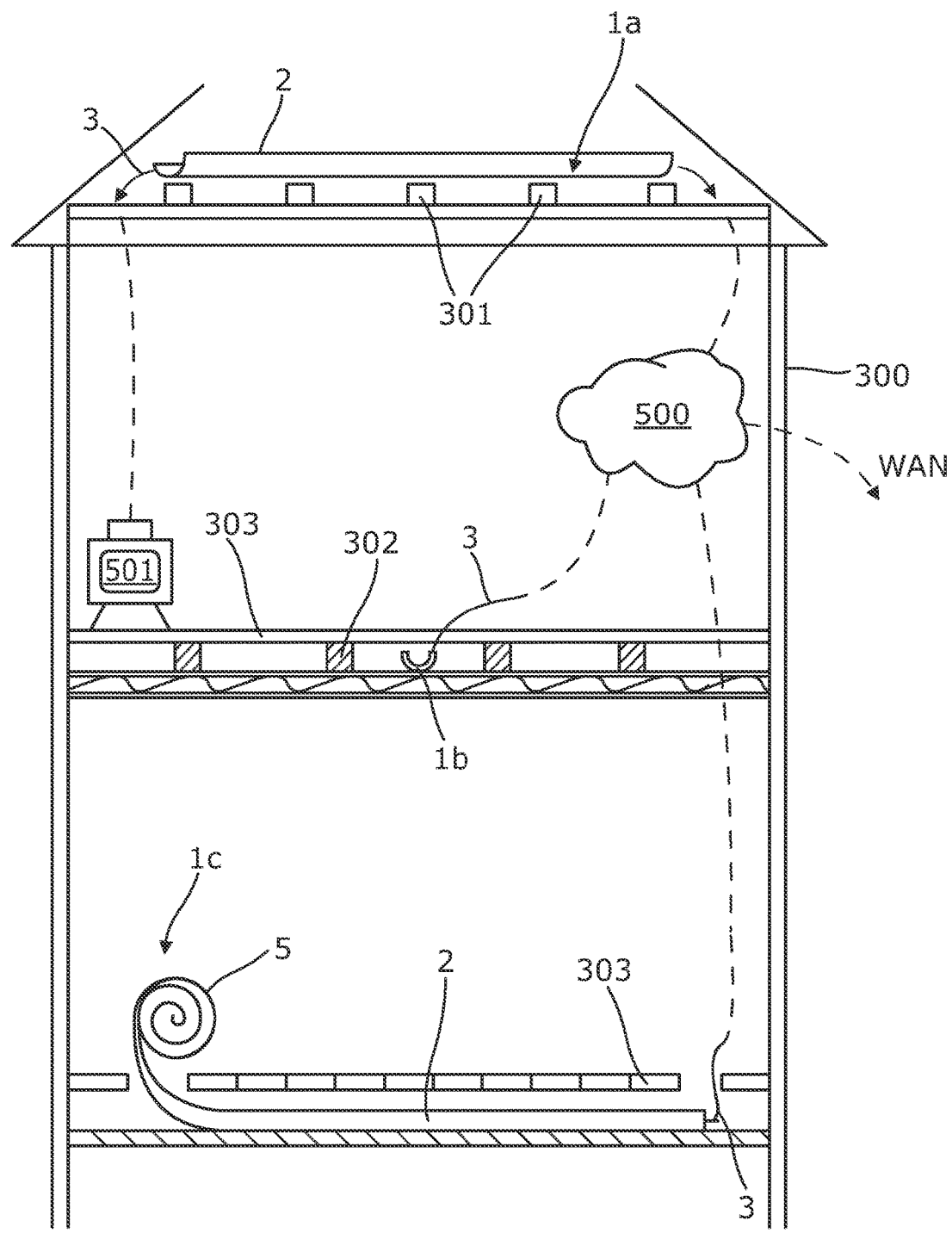
FIG. 9 shows another example of an optical fibre communication system according to an embodiment of the present invention in some aspects.

Similarly, the fibre optic assembly can be used in a building to quickly and simply lay fibre optic networks in ducts or ceiling spaces or the like. FIG. 9 shows a building 300 in which a first fibre optic assembly 1a is positioned in the attic space. The stiffness of the member 2 controls the position and/or tension of the fibre optic, e.g. to be straight or generally axially aligned with the member, even when it is resting on joists 301 in the ceiling such that sections of the optical fibre are unsupported. Thus, the performance of the optical fibre is not degraded due to bending as the resilience of the extended member 2 resists the external forces acting on the fibre optics (in this case its own weight) which would otherwise cause a standard cable to sag and lose performance.

FIG. 9 also shows fibre optic assemblies 1b,1c laid under the floorboards 303. The stiffness of the member 2 allows the assembly to be pushed into the space between joists 302 overcoming frictional resistances and being guided around potentially obstacles in its path. Thus, the number of floorboards 303 that would have to be removed is minimised. In principle, only two floorboards need to be removed at the start point and end point of the assembly. The assembly 1c can be progressively unwound from its coiled form 5 and fed into the space under the floorboards 303, which is beneficial in working in confined spaces. If required, the assembly can be cut to length. Once deployed, connections are made at both ends of the cable assembly 1 to the rest of the network 500 or peripherals 501 or other entity. As will be appreciated, the advantages described operate equally in other situations where access to a space is limited and not just where the fibre is to be positioned under floorboards.

Figure 5:
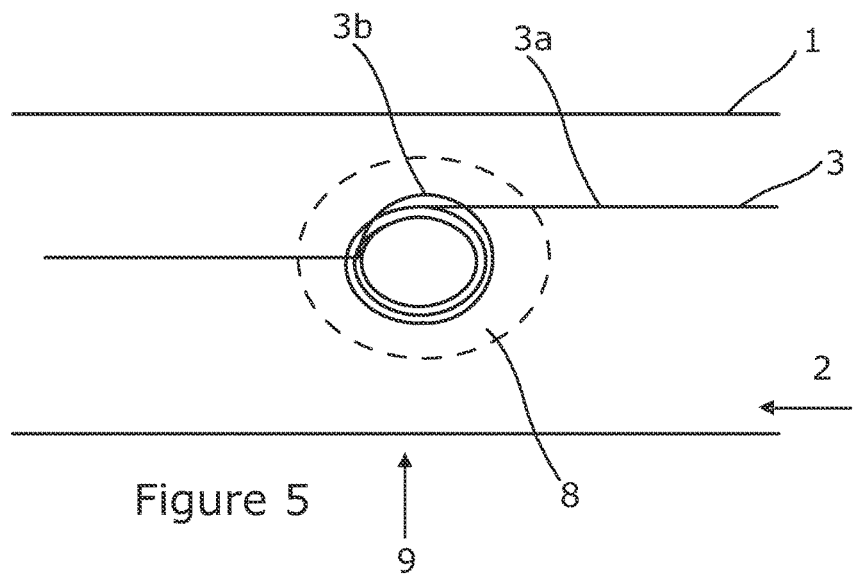
FIGS. 5 and 6 show examples of arrangements of a fibre optic sensor within an elongate member of a sensor assembly.

FIG. 5 shows another example of the fibre optic assembly 1. In this example, a "pocket" 8 (shown by broken lines) is formed within the member in which the fibre optic sensor 3 is not strongly coupled to the member and is thus not constrained to move with the member. The part 3b of the fibre optic sensor in this pocket 8 is not straight or taut like the parts 3a that are fixed to the member 2 outside the pocket 8. In the present example, the part 3b which is not strongly coupled is looped or coiled.

Figure 6:
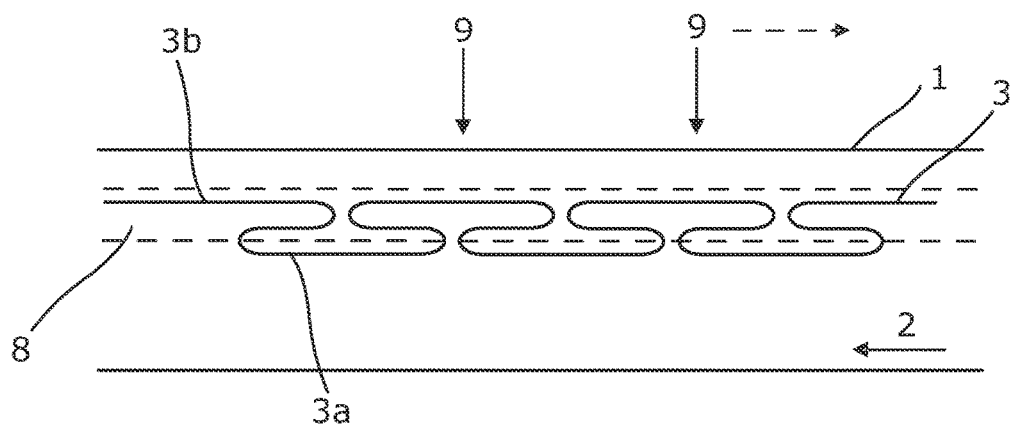

FIG. 6 shows another example, in which a pocket 8 (shown by broken lines) is formed along the length of the member 2. The fibre optic sensor 3 is periodically looped within the pocket 8 to create portions 3b that are not coupled to the member 2, and portions 3a that are coupled to the member 2.

The pockets of FIGS. 5 and 6 can be simply made during manufacture by applying a release film to the opposing surfaces of the layers forming the member in the region of the pockets so that they are not laminated together in the region of the pocket. The arrangements of FIGS. 5 and 6 have the following advantages.

First, strains in the member 2 are transferred to the parts 3a of the fibre optic sensor 3 that are strongly coupled to the member 2 and thus kept taut, but not to the parts 3b in the pocket which are loosely coupled or not fixed to the member 2. This is beneficial when the fibre optic assembly 1 is used as a sensor assembly 1 in allowing measurements of temperature and strain to be separated when analysing the optical fibre sensor 3 readings. It has been described earlier in this document how a separate control fibre can be used to eliminate or reduce the effects of changing temperature on the reading taken from another fibre which is strongly coupled to the member 2. In the present example, a similar process can be used by in effect having a "control" portion of the fibre which is not affected by strain, rather than providing a separate "control" fibre as in the earlier example.

Figure 7:
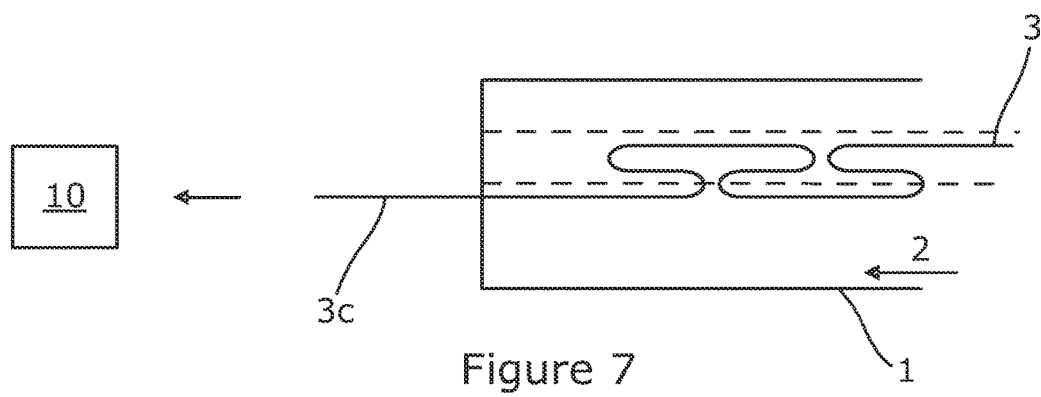
FIG. 7 shows a cut taken along line 9 through the sensor assembly of FIG. 6.

Second, the arrangement of FIGS. 5 and 6 has a further advantage in that plural pockets 8 and looped fibre optic sensor portions 3b can be created along the length of the member 2. This allows the member 2 to be cut to a desired size at any point 9 coinciding with a pocket 8. For example, pockets 8 can be provided every 1 m of length. FIG. 7 shows the fibre optic assembly 1 of FIG. 6 cut along a section 9. The looped part 3b of the fibre optic 3 within the pocket 8 can then be extended out to provide a portion 3c to which connection can be made by the measurement system 10.

Typically, the fibre optical will have a coating which needs to be stripped by an appropriate chemical or mechanical means or application of heat to allow connection to be made. Thus, the fibre optic assembly 1 can be manufactured in the form of a long length which can be cut to size according to need and provides a simple way of connecting to the fibre optic 3. This technique can be used when the assembly 1 is used for sensing or communications or potentially any use.

Furthermore, when the fibre optic assembly 1 is deployed, the pockets 8 allow a convenient point at which the cable can be split and a new connection made. This can be useful in adding subscribers to a cable network.

RFID tags, magnetic markers or similar wireless transponders or markers may be fixed to the member 2 proximate the pockets 8 so that the location of the pockets 8 can be readily determined by sensing the tag, marker or transponder with a detector. This is useful in locating the pockets when the assembly 1 is deployed, e.g. buried in the ground so that a new connection can be made at that point.

As will be appreciated, a fibre will have a stated minimum bending radius, below which it will not function effectively, or indeed, at all. Thus any coils, loops or curved portions of the fibre in the embodiments disclosed herein should preferably be made so as to observe the fibre-specific limitations on bending that avoid unacceptable levels of loss.

Embodiments of the present invention have been described with particular reference to the example illustrated. However, it will be appreciated that variations and modifications may be made to the examples described within the scope of the present invention.

The invention claimed is:

1. A method of deploying a sensor assembly for sensing a property associated with a structure of interest, the sensor assembly comprising:
   an elongate member constructed and arranged so as to be configurable between a coiled form and an extended form, wherein when coiled the member is wound about an axis extending transversely to a longitudinal extent of the member, and wherein when extended the member is resiliently biased in that form; and,
   at least one sensor comprising a fibre optic disposed along at least a part of the longitudinal extent of the member, wherein at least a part of the sensor is fixed to the member such that the resiliency of the elongate member in its extended form provides a stiff substrate that controls at least one of the position and pre-tension of that part of the sensor while the assembly is being buried in a form in which it is not clipped around a supporting structure such that strains experienced by the member are transmitted to the sensor as required for sensing,
   the method comprising:
   uncoiling the elongate member and positioning the sensor assembly; and
   burying the sensor assembly by forming the structure of interest around the sensor assembly or introducing a filler material in the space between the sensor assembly and the structure of interest, such that the sensor assembly is coupled to the structure and the property of the structure can be sensed by the sensor.

2. A method according to claim 1, wherein forming the structure of interest comprises casting a settable material or particulate material around the sensor assembly.

3. A method according to claim 1, wherein introducing a filler material comprises introducing a settable material or a particulate material between the structure and the sensor assembly.

4. A method according to claim 1, wherein said part of the sensor that is fixed to the member is taut when the member is extended.

5. A method according to claim 4, wherein another part of the sensor disposed along the member or at least part of another sensor disposed along the member is not taut when the member is extended and is not fixed to the member so as to be movable relative to the member.

6. A method according to claim 5, wherein the member is formed from a laminate of at least two layers and said sensor is fixed between two of the layers, wherein the laminate contains at least one pocket where the layers are not laminated in which the sensor is not taut and can move relative to the member.

7. A method according to claim 5, wherein said part of the sensor that is not taut and that can move relative to the member forms a loop or coil.

8. A method according to claim 5, wherein said part of the sensor that is not taut and that can move relative to the member has plural parts forming loops or coils at spaced intervals along the member with a taut part between each loop or coil of the loops or coils.

9. A method according to claim 1, wherein said part of the sensor that is fixed to the member is parallel to the longitudinal extent of the member.

10. A method according to claim 5, wherein said portion of sensor that is taut is more angled with respect to the longitudinal extent of the member relative to said portion of the sensor that is not taut and that can move relative to the member.

11. A method according to claim 1, wherein portions of the sensor are more angled with respect to the longitudinal extent of the member relative to other portions of the sensor that are less angled with respect to the longitudinal extent of the member, wherein longitudinal portions of the member to which the more angled portions of sensor are fixed have a lower modulus relative to other longitudinal portions of the member to which less angled portions of the sensor are fixed.

12. A method according to claim 9, wherein the sensor follows a repeating curved path relative to the longitudinal extent of the member.

13. A method according to claim 1, further comprising attaching electronic apparatus to the sensor assembly in communication with the sensor arranged to provide at least one of: i) a data logging system to allow readings from the sensor to be logged and ii) a data transmitting system to allow readings from the sensor to be transmitted remotely.

14. A method according to claim 1, further comprising:
   sensing a property associated with the structure comprising at least one of:
   a) sensing temperature;
   b) sensing pressure;
   c) sensing vibration;
   d) sensing stress; and
   e) sensing strain
   of the structure.

15. A method according to claim 14, further comprising separating effects of temperature variation from a property other than temperature associated with the structure by sensing with at least a part of the sensor that is fixed to the member and with a part of the sensor or another sensor that can move relative to the member.

16. A method of deploying a fibre optic assembly for a communication network, the fibre optic assembly comprising:

an elongate member constructed and arranged so as to be configurable between a coiled form and an extended form, wherein when coiled the member is wound about an axis extending transversely to a longitudinal extent of the member, and wherein when extended the member is resiliently biased in that form; and, at least one fibre optic, at least a part of which is coupled to the member along at least a part of the longitudinal extent of the member such that the resiliency of the elongate member in its extended form provides a stiff substrate that controls the position and/or pre-tension of that part of the fibre optic while the assembly is positioned in a form in which it is not clipped around a supporting structure, the method comprising:

uncoiling the elongate member and positioning the fibre optic assembly.

17. A method according to claim 16, further comprising, after positioning the fibre optic assembly, then in-filling around the fibre optic assembly.

18. A method according to claim 17, wherein a stiffness of the elongate member acts to maintain the fibre optic in a substantially straight position during the in-filling.

19. A method according to claim 16, wherein positioning the fibre optic assembly comprises pushing the fibre optic assembly into a confined space, wherein a stiffness of the elongate member allows the assembly to be pushed into position.

20. A method according to claim 16, wherein positioning the fibre optic assembly comprises supporting the assembly at first and second positions, such that at least a portion of the assembly between the first and second positions is unsupported, wherein a stiffness of the member prevents the assembly from sagging between the first and second positions.

21. A method according to claim 16, wherein the fibre optic has at least one part forming a loop or coil in a pocket along the member, wherein the loop or coil is not coupled to the member.

22. A method according to claim 21, wherein a wirelessly detectable tag or marker is fixed to the member proximate the loop or coil.

23. A fibre optic assembly for sensing a property associated with a structure of interest or for deployment in a communication network, the assembly comprising:

an elongate member constructed and arranged so as to be configurable between a coiled form and an extended form, wherein when coiled the member is wound about an axis extending transversely to the longitudinal extent of the member, and wherein when extended the member is resiliently biased in that form; and at least one fibre optic disposed along at least a part of the longitudinal extent of the member wherein at least a part of the fibre optic is fixed to the member such that the resiliency of the elongate member in its extended form provides a stiff substrate that controls the position and/or pre-tension of that part of the fibre optic while the assembly is being buried in a form in which it is not clipped around a supporting structure to allow effective propagation of light within the fibre optic, wherein an end of the fibre optic is adapted to connect with an electronic apparatus for sensing and/or transmitting data to and/or from the fibre optic.

24. A fibre optic assembly according to claim 23, further comprising a structure formed around the fibre optic assembly.

* * * * *